United States Patent
Lang

(10) Patent No.: US 8,744,785 B2
(45) Date of Patent: Jun. 3, 2014

(54) DETERMINATION OF A RECEPTION TIME OF AN ULTRASONIC SIGNAL BY MEANS OF PULSE SHAPE DETECTION

(75) Inventor: Tobias Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1394 days.

(21) Appl. No.: 10/591,897

(22) PCT Filed: Apr. 21, 2005

(86) PCT No.: PCT/EP2005/051761
§ 371 (c)(1),
(2), (4) Date: Sep. 7, 2006

(87) PCT Pub. No.: WO2005/114112
PCT Pub. Date: Dec. 1, 2005

(65) Prior Publication Data
US 2007/0186680 A1    Aug. 16, 2007

(30) Foreign Application Priority Data

May 22, 2004  (DE) .......................... 10 2004 025 243

(51) Int. Cl.
*G01F 1/00*    (2006.01)
(52) U.S. Cl.
USPC ......................................................... 702/48
(58) Field of Classification Search
USPC ........... 702/33, 35, 39, 45, 48, 66, 71, 79, 89, 702/715, 185; 73/861.18, 861.27, 861.28
See application file for complete search history.

(56) References Cited

U.S. PATENT DOCUMENTS

| | | | | |
|---|---|---|---|---|
| 4,022,058 A * | 5/1977 | Brown | ...................... | 73/861.28 |
| 4,542,656 A * | 9/1985 | Johnson | ..................... | 73/861.28 |
| 4,583,410 A * | 4/1986 | O'Neil | ........................ | 73/861.28 |
| 4,603,589 A * | 8/1986 | Machida | .................... | 73/861.28 |
| 4,660,564 A * | 4/1987 | Benthin et al. | ................ | 600/449 |
| 4,922,750 A * | 5/1990 | Magori | ....................... | 73/114.32 |
| 4,933,915 A * | 6/1990 | Bostrom | ......................... | 367/99 |
| 5,035,147 A * | 7/1991 | Woodward | ................. | 73/861.28 |
| 5,390,676 A * | 2/1995 | Katakura | ...................... | 600/455 |
| 5,421,212 A * | 6/1995 | Mayranen et al. | .......... | 73/861.29 |
| 5,633,715 A * | 5/1997 | Ai et al. | ........................ | 356/497 |
| 5,639,971 A | 6/1997 | Brown | | |
| 5,793,704 A * | 8/1998 | Freger | ............................ | 367/95 |
| 6,634,240 B1 * | 10/2003 | Wallen | ....................... | 73/861.28 |

FOREIGN PATENT DOCUMENTS

| | | |
|---|---|---|
| EP | 0 829 734 | 3/1998 |
| EP | 0 981 201 | 2/2000 |
| EP | 1 211 488 | 6/2002 |
| JP | 60187815 | 9/1985 |

(Continued)

*Primary Examiner* — Aditya Bhat
(74) *Attorney, Agent, or Firm* — Michael J. Striker

(57) ABSTRACT

The present invention relates to an ultrasonic flow sensor equipped with at least one ultrasonic transducer (A, B) for transmitting and receiving ultrasonic signals (A0, B0) and one receiver unit (4) that is connected to the ultrasonic transducer (A, B) and detects a zero crossing (N) of the ultrasonic signal (A0, B0) as a reception time after the ultrasonic signal (A0, B0) has exceeded a predetermined threshold (SW). The measurement precision of the sensor can be significantly improved if the receiver unit (4) determines the time of a value characteristic of the ultrasonic signal (A0, B0) and determines the relative time shift (deltat) of the characteristic value ($Amp_{max}$, $T_s$) in relation to the zero crossing ($N_0$, $N_1$) that is detected as the reception time ($t_0$).

5 Claims, 4 Drawing Sheets

(56) References Cited

FOREIGN PATENT DOCUMENTS

| JP | 2003050145 | | | 2/2003 | | |
|----|------------|---|---|--------|---|---|
| JP | 2003050145 | A | * | 2/2003 | ............... | G01F 1/66 |
| JP | 2003050145 | A | * | 2/2003 | ............... | G01F 1/66 |
| JP | 2003279396 | | | 10/2003 | | |
| JP | 2005259985 | | | 9/2005 | | |

* cited by examiner

Prior Art

DETERMINATION OF A RECEPTION TIME OF AN ULTRASONIC SIGNAL BY MEANS OF PULSE SHAPE DETECTION

The present invention relates to an ultrasonic flow sensor and to a method for determining the reception time of an ultrasonic signal.

Ultrasonic flow sensors are used in particular to measure the volumetric or mass flow or the flow velocity of a gaseous or fluid medium flowing through a conduit. A known type of ultrasonic flow sensors includes two ultrasonic transducers situated offset from each other in the flow direction, each of which generates ultrasonic signals and transmits them to the respective other ultrasonic transducer. The ultrasonic signals are received by the respective other transducer and evaluated by a set of electronics. The travel time difference between the signal traveling in the flow direction and the signal traveling counter to the flow direction functions is a measure for the flow velocity of the fluid. This can be used to calculate the desired measurement quantity, e.g. a volumetric or mass flow.

FIG. 1 shows a typical arrangement of an ultrasonic flow sensor with two ultrasonic transducers A, B, which are situated inside a conduit 3 and are spaced apart from each other by a distance L. A fluid 1 flows in the conduit 3 at a velocity v in the direction of the arrow 2. The measurement distance L is inclined at an angle $\alpha$ in relation to the flow direction 2. During a measurement, the ultrasonic transducers A, B send each other ultrasonic signals that are either slowed or accelerated, depending on the direction of the flow. The travel times of the ultrasonic signals thereby function as a measure for the flow velocity that is to be determined.

FIG. 2 shows a very simplified schematic depiction of a transducer arrangement connected to control and evaluation electronics 4. The flow sensor can, for example, function in accordance with the so-called "sing around" method. In this method, the reception of an ultrasonic signal A0, B0 at one of the transducers A, B immediately triggers the emission of an ultrasonic signal in the opposite direction.

In order to measure the travel time of an ultrasonic signal A0, B0, it is essential to unambiguously and precisely determine the reception time of the ultrasonic signal A0, B0. One method for determining the reception time known from the prior art will be explained below in conjunction with FIG. 3.

FIG. 3 shows the signal curve of an individual ultrasonic signal A0, B0. In this instance, the "reception time" of the signal A0, B0 is defined as the first zero crossing $N_0$ of the signal after the signal amplitude Amp has exceeded a predetermined threshold SW (the so-called pretrigger level). In the example shown, the time $t_0$ would thus be the reception time of the signal. (The reception time of the signal could alternatively also be determined in a different manner, e.g. through evaluation of the phase of the signal.)

Contamination, drifting, or aging of the ultrasonic transducers, or turbulences in the flowing fluid can cause sharp fluctuations in the amplitude of the ultrasonic signals A0, B0. As long as the signal amplitude does not change too drastically, the zero crossing detection remains virtually unaffected since the same zero crossing (with regard to the overall signal) is always detected as the reception time and the frequency of the signal remains essentially the same. As soon as the amplitude of the half-wave occurring before the time $t_0$ exceeds the threshold SW, then erroneous measurements of the reception time can occur since the ultrasonic signal then exceeds the threshold SW at a later time and consequently, an incorrect zero crossing is detected as the reception time.

FIG. 4 shows the signal curve of the ultrasonic signal A0, B0 or transducer output signal 5 with a reduced amplitude Amp. This signal exceeds the fixed threshold SW at a later time. The receiver unit 4 in this case determines the zero crossing $N_1$ and therefore an incorrect zero crossing N as the reception time $t_0$ of the ultrasonic signal A0, B0. The travel time measurement of the ultrasonic signal A0, B0 is thus shifted by integral multiples of $\pm 1/f$ or $\pm 1/(2f)$ (f=ultrasonic frequency), which significantly impairs the measurement precision. A powerful increase in the amplitude Amp of the ultrasonic signal A0, B0 or of the corresponding transducer output signal 5 can also shift the detected reception time $t_0$ toward earlier zero crossings N (not shown).

The object of the present invention, therefore, is to improve the measurement precision of an ultrasonic flow sensor in the event of sharply fluctuating signal amplitudes of the ultrasonic signal.

This object is attained according to the present invention according to the one or more independent claims. Other embodiments of the present invention are the subject of the dependent claims.

An essential aspect of the present invention lies in determining the time of a characteristic value for the form of the ultrasonic signal (e.g. the time of the maximum amplitude, time of the signal focal point, or time of the envelope curve focal point) as a reference point, determining a reception time (e.g. a zero crossing), and determining the relative time shift of the reference time in relation to the reception time. The time shift between the reference time and the reception event remains unchanged as long as the threshold lies between the same two amplitudes of the ultrasonic signal. If the amplitude of the ultrasonic signal or of the associated transducer output signal changes drastically enough that the threshold now lies between two different amplitudes of the signal, then the time difference between the characteristic value and the detected reception event changes abruptly. The receiver unit of the ultrasonic flow sensor can detect this and correspondingly correct the reception time.

The characterizing value is preferably a value that is independent of the signal amplitude, e.g. the time of the maximum amplitude, time of the signal focal point, or time of the envelope curve focal point.

According to a preferred embodiment form of the present invention, the time of the envelope curve focal point determines the reference point. The time of the envelope curve focal point can be calculated, for example, in a processor unit according to the following equation:

$$T_s \sim \left(\sum_{k=1}^{n} k * A(k)\right) \bigg/ \sum_{k=1}^{n} A(k),$$

where k is a running index that describes the number of positive half-waves of the ultrasonic signal after the threshold is exceeded. A(k) is the amplitude of the $k^{th}$ half-wave after the threshold (trigger time) is exceeded.

According to another embodiment form of the present invention, the receiver unit includes a device for determining the maximum amplitude of the ultrasonic signal. In this instance, the characteristic value is the maximum amplitude of the ultrasonic signal. In principle, the selection of the maximum amplitude of the ultrasonic signal as the reference time produces the same result as the selection of the envelope curve focal point, on condition that the position of the maximum amplitude does not change in relation to the other amplitudes. But if the position of the maximum amplitude does change in relation to the other amplitudes, then erroneous measurements can occur because the time interval between the detected reception time $t_0$ and the reference time changes by n*2pi.

The receiver unit preferably includes a comparator, whose input is supplied with the transducer output signal generated by the ultrasonic transducer and is also supplied with a reference signal (e.g. a threshold voltage); based on the output signal of the comparator, the receiver unit determines a piece of information about the reference time (e.g. the time of the maximum amplitude or envelope curve focal point).

The reception event is preferably a zero crossing, but can also be another predetermined criterion.

The receiver unit is preferably able to correct the reception time as a function of its chronological position in relation to the reference time.

The present invention will be explained in detail below by way of example in conjunction with the accompanying drawings.

For explanations with regard to FIGS. 1 through 4, the reader is hereby referred to the introduction to the specification.

As mentioned above, FIG. 3 shows the determination of the reception time $t_0$ of an ultrasonic signal A0, B0 through zero crossing detection. In this instance, the detected reception time $t_0$ is the first zero crossing $N_0$ of the signal A0, B0 after the signal A0, B0 has exceeded a predetermined threshold SW. (Alternatively, a different event, e.g. the exceeding of a threshold, could also be defined as a reception event.)

The receiver unit 4 (FIG. 2) also determines the time $t_1$ of the maximum signal amplitude $Amp_{max}$ and the time difference $\Delta t$ between the reception time $t_0$ and the time $t_1$. (Alternatively, the time of a different characteristic value, e.g. the time of the envelope curve 6 focal point, can also be determined as the reference time $t_1$.)

With a sharp change in the signal amplitude Amp of the ultrasonic signal (see FIG. 4), the incorrect zero crossing ($N_1$ here) is detected as the reception time $t_0$. The time difference $\Delta t$ thus changes abruptly by integral multiples of $\pm 1/f$ or $\pm 1/(2f)$, where f is the ultrasonic frequency. The receiver unit 4 detects this and correspondingly corrects the reception time $t_0$.

Figure 1:
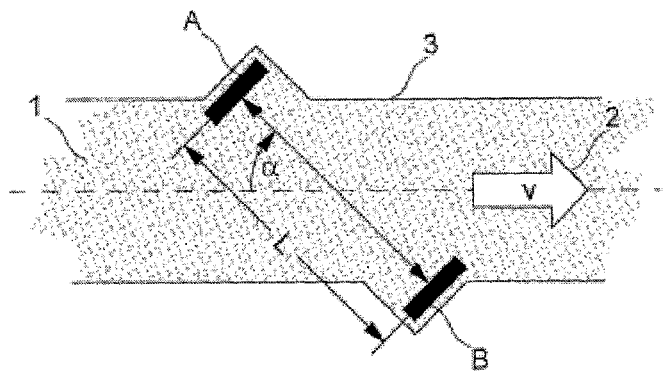
FIG. 1 shows an ultrasonic flow sensor that is known from the prior art and is equipped with two ultrasonic transducers.
Figure 2:
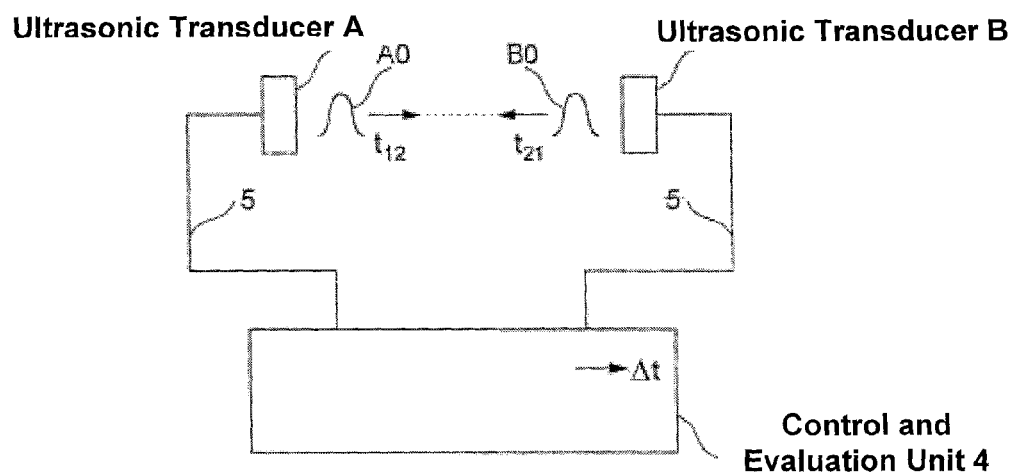
FIG. 2 shows an ultrasonic flow sensor with an associated control and reception circuit.
Figure 3:
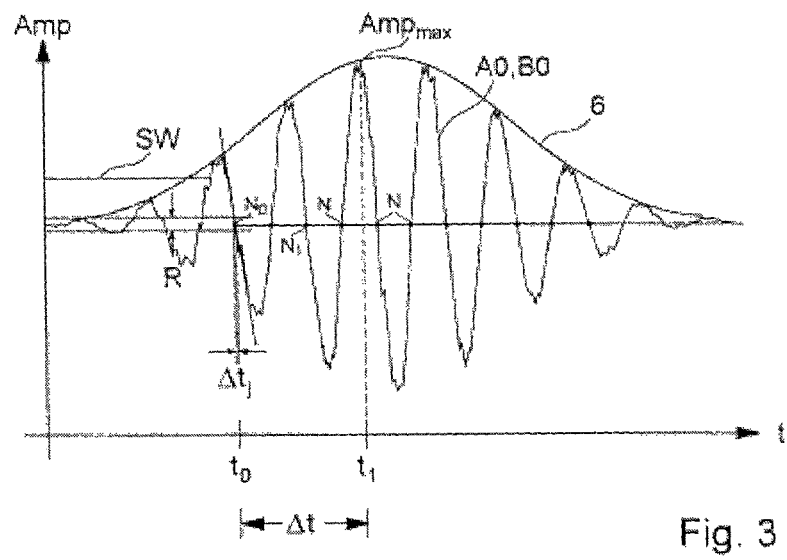
FIG. 3 shows the signal curve of an individual ultrasonic signal with a high amplitude.
Figure 4:
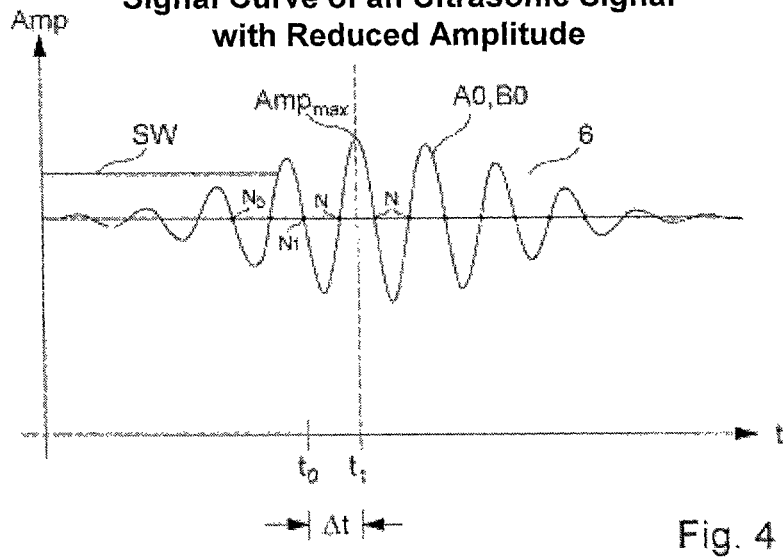
FIG. 4 shows the signal curve of an individual ultrasonic signal with a low amplitude.
Figure 5:
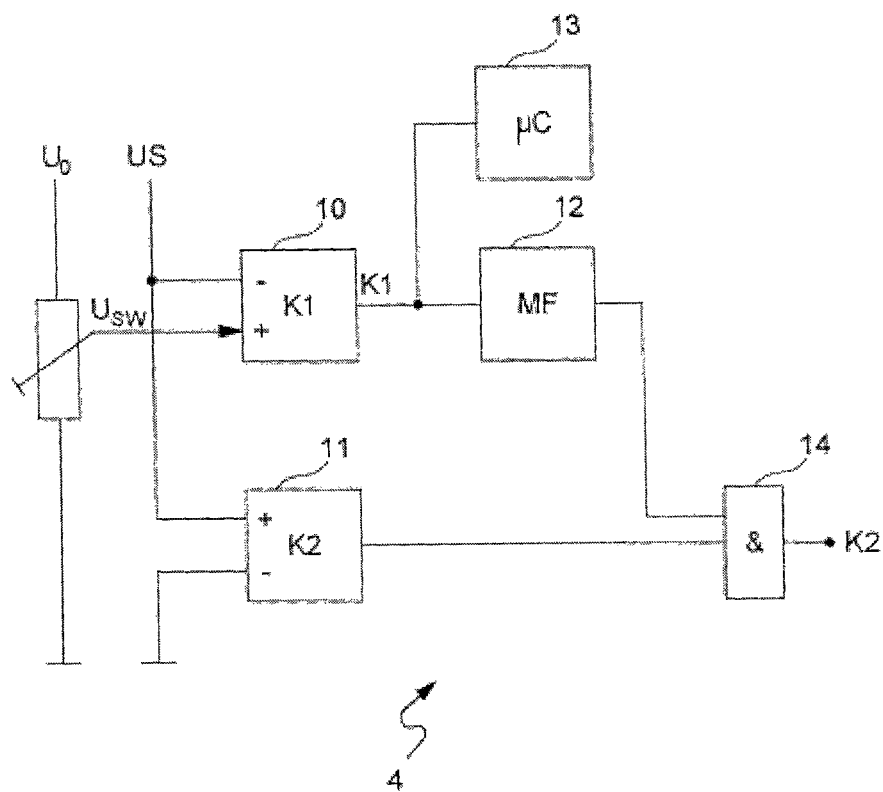
FIG. 5 shows a circuit for zero crossing detection known from the prior art.

FIG. 5 shows a known logic circuit, which is designed for zero crossing detection and is capable of determining the reception time $t_0$. The circuit includes a first comparator 10, whose input (−) is supplied with the ultrasonic signal US or the corresponding transducer output signal 5 and whose other input (+) is supplied with a threshold voltage $U_{SW}$ as a reference. The output of the comparator 10 switches to the "high" state whenever the amplitude of the ultrasonic signal A0, B0 exceeds the reference voltage $U_{SW}$. The time of the maximum amplitude $Amp_{max}$ can be determined from the duration of the high phases.

The second comparator 11 in FIG. 5 is used for zero crossing detection. To achieve this, the second comparator 11 is supplied with the ultrasonic signal US at its positive input (+) and is supplied with a corresponding reference voltage (0V here) at its negative input (−). The output signal $K_1$, $K_2$ of the comparators 10, 11 is shown in FIG. 6.

Figure 6:
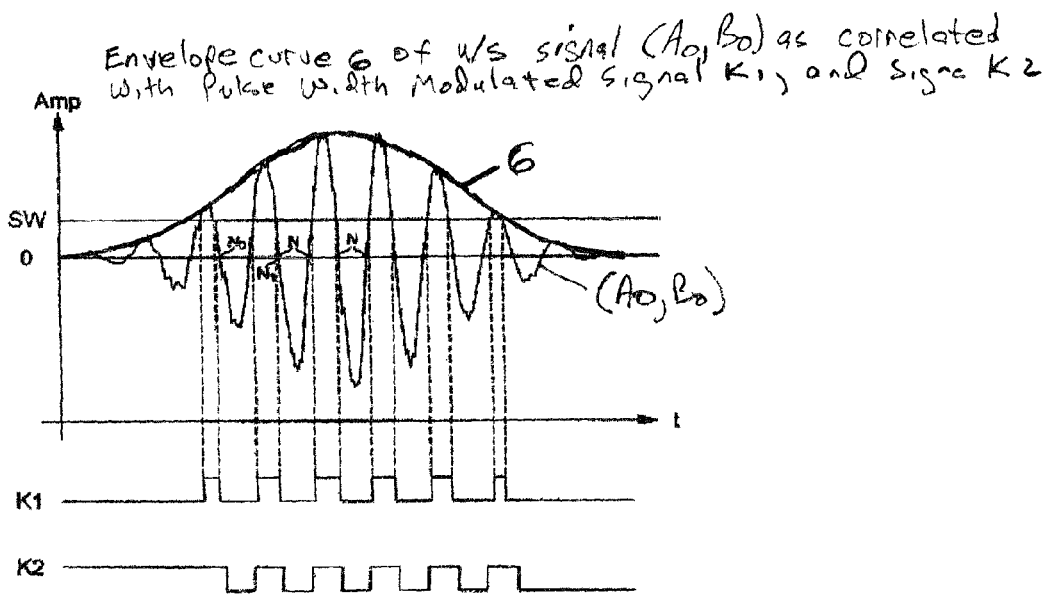
FIG. 6 shows an envelope curve 6 of u/s signal (A0, B0) correlated with pulse-width modulated signal $K_1$, and signal $K_2$.

FIG. 6 shows the pulse width modulated output signal $K_1$ of the first comparator 10. The individual high phases of the signal $K_1$ can, for example, be stored and evaluated in various counters. The longest high phase indicates the maximum amplitude $Amp_{max}$ of the ultrasonic signal A0, B0.

The comparator output signal could be processed in analog or digital fashion or can be arithmetically evaluated. It would thus be possible, for example, to carry out a cross correlation among various output signals $K_1$.

According to a preferred embodiment form of the present invention, a focal point $T_s$ of the envelope curve 6 of the ultrasonic signal A0, B0 is used as a characteristic value that is set in relation to the detected reception time $t_0$. The chronological focal point $T_s$ of the envelope curve 6 can, for example, be determined from the following equation:

$$T_s \sim \left(\sum_{k=1}^{n} k * A(k)\right) / \sum_{k=1}^{n} A(k),$$

where k is a running index that describes the number of positive half-waves of the ultrasonic signal after the threshold SW is exceeded. A(k) is the amplitude of the kth half-wave after the threshold (trigger time) is exceeded. $T_s$ is the chronological focal point of envelope curve 6.

Figure 7:
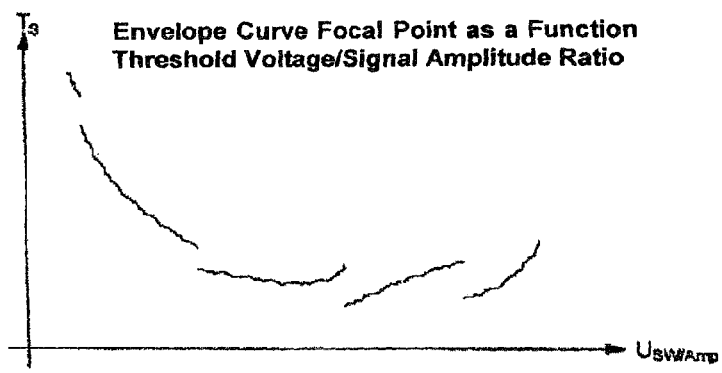
FIG. 7 shows the curve of an envelope curve focal point of the ultrasonic signal as a function of the threshold voltage/signal amplitude ratio.

FIG. 7 shows the curve of the focal point $T_s$ of envelope curve 6 as a function of the ratio of the threshold voltage $U_{sw}$ to the signal amplitude Amp. Whenever the amplitude Amp of the ultrasonic signal A0, B0 changes so intensely that the threshold USW is exceeded one signal period earlier or later, then a jump occurs in the signal $T_s$.

Since a higher amplitude A(k) also results in a greater high time of the first comparator 10, then in a coarse, but sufficiently good approximation, A(k) can be replaced by the high time of the signal $K_1$. The first sum of the above-mentioned equation can be carried out without any arithmetic functions, e.g. by means of a counter whose clock input is enabled by the high level of the pulse width modulated comparator output signal $K_1$. The multiplication with the running index k can be carried out without arithmetic by correspondingly increasing or decreasing the clock frequency of the counter with each half-wave.

REFERENCE NUMERAL LIST 1 fluid
2 flow direction
3 conduit
4 control and evaluation unit
5 transducer output signal
6 envelope curve
10 first comparator
11 second comparator
12 monoflop
13 processing unit
14 AND gate
$K_1$ comparator output signal
$K_2$ comparator output signal
SW threshold
A, B ultrasonic transducer
A0, B0 ultrasonic signals
$Amp_{max}$ maximum amplitude
$t_0$ reception time
$\Delta t$ time shift USW threshold voltage
US ultrasonic signal input
$T_s$ envelope curve focal point

What is claimed is:

1. An ultrasonic flow sensor, comprising
at least one ultrasonic transducer for transmitting and receiving ultrasonic signals, and
a receiver unit (4) connected to the at least one ultrasonic transducer that detects a predetermined event (N) of an ultrasonic signal as a reception time ($t_0$), wherein the receiver unit (4) determines a time ($t_1$) of a characteristic value of the ultrasonic signal as well as a time shift ($\Delta t$) of the time ($t_1$) relative to the reception time ($t_0$) and uses the time shift ($\Delta t$) to determine a correct time value for the reception time ($t_0$), wherein the receiver unit (4) determines a chronological position ($T_s$) of a focal point of either the ultrasonic signal or its envelope curve (6) as the characteristic value, wherein $$Ts \sim \left(\sum_{K=1}^{n} K*A(K)\right) \bigg/ \sum_{K=1}^{n} A(K).$$

2. The ultrasonic flow sensor as recited in claim 1, wherein the receiver unit (4) includes a comparator (10) comprising inputs that are respectively supplied with a transducer output signal (5) and a reference signal (SW), and the receiver unit (4) determines a piece of information about the time ($t_1$) of the characteristic value from an output signal of the comparator (10).

3. The ultrasonic flow sensor as recited in claim 2, wherein the reference signal supplied to the comparator (10) is a threshold (SW) not equal to zero and the output signal of the comparator (10) is a pulse width modulated signal (K1) from which the time ($t_1$) of the characteristic value is determined.

4. The ultrasonic flow sensor as recited in claim 1, wherein the reception time ($t_0$) is corrected as a function of the time shift ($\Delta t$).

5. A method for detection of an ultrasonic signal in an ultrasonic transducer by means of a receiver unit (4), which detects a predetermined event (N) of the ultrasonic signal as a reception time ($t_0$), wherein the receiver unit (4) determines a time ($t_1$) of a characteristic value of the ultrasonic signal and determines a time shift ($\Delta t$) of the time ($t_1$) in relation to the reception time ($t_0$) and uses the time shift ($\Delta t$) to determine a correct time value for the reception time ($t_0$), wherein the receiver unit (4) determines a chronological position ($T_s$) of a focal point of the ultrasonic signal or its envelope curve (6) as the characteristic value, wherein $$Ts \sim \left(\sum_{K=1}^{n} K*A(K)\right) \bigg/ \sum_{K=1}^{n} A(K).$$

* * * * *